Figure 10:
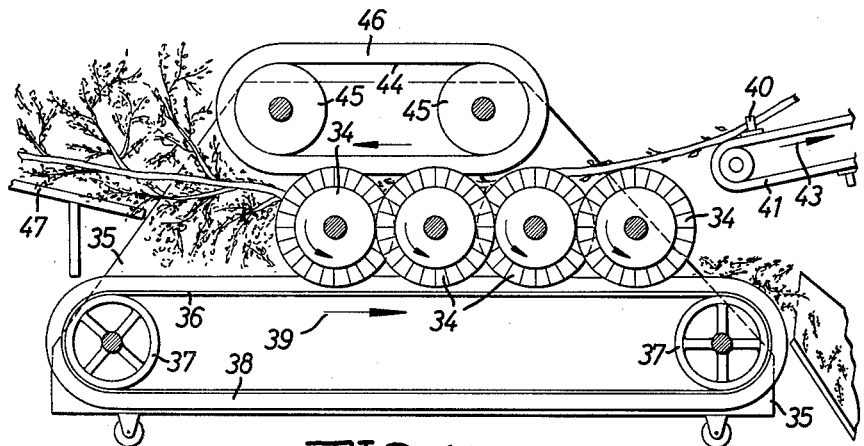

July 24, 1962
F. KIBINGER ETAL
3,045,679
HOP PICKER
Filed Aug. 17, 1959
7 Sheets-Sheet 1
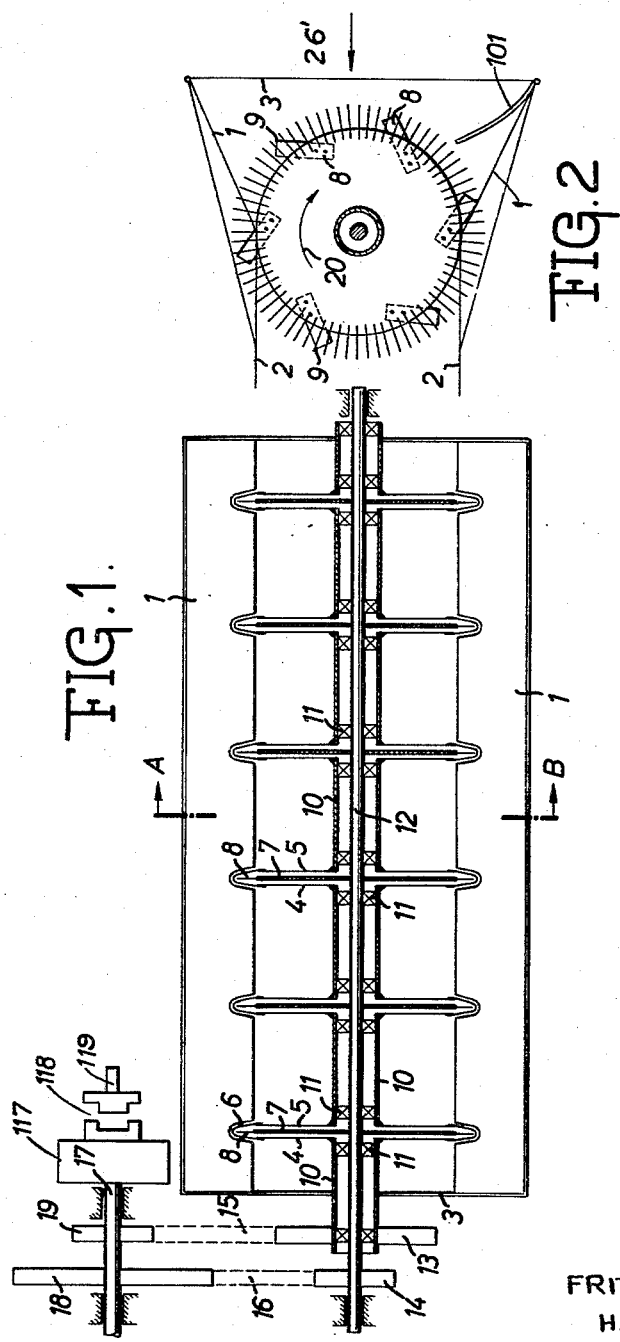
INVENTORS
FRITZ KIBINGER
HANS EDER
BY
Dicke and Craig
ATTORNEYS

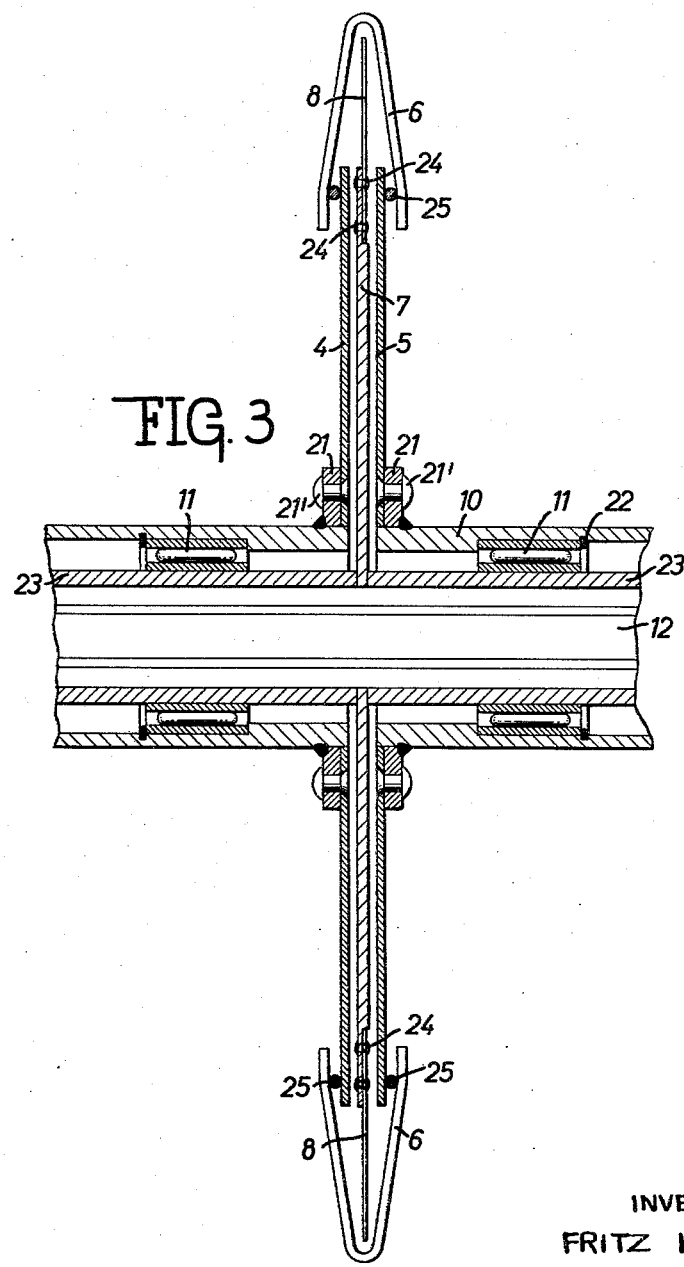

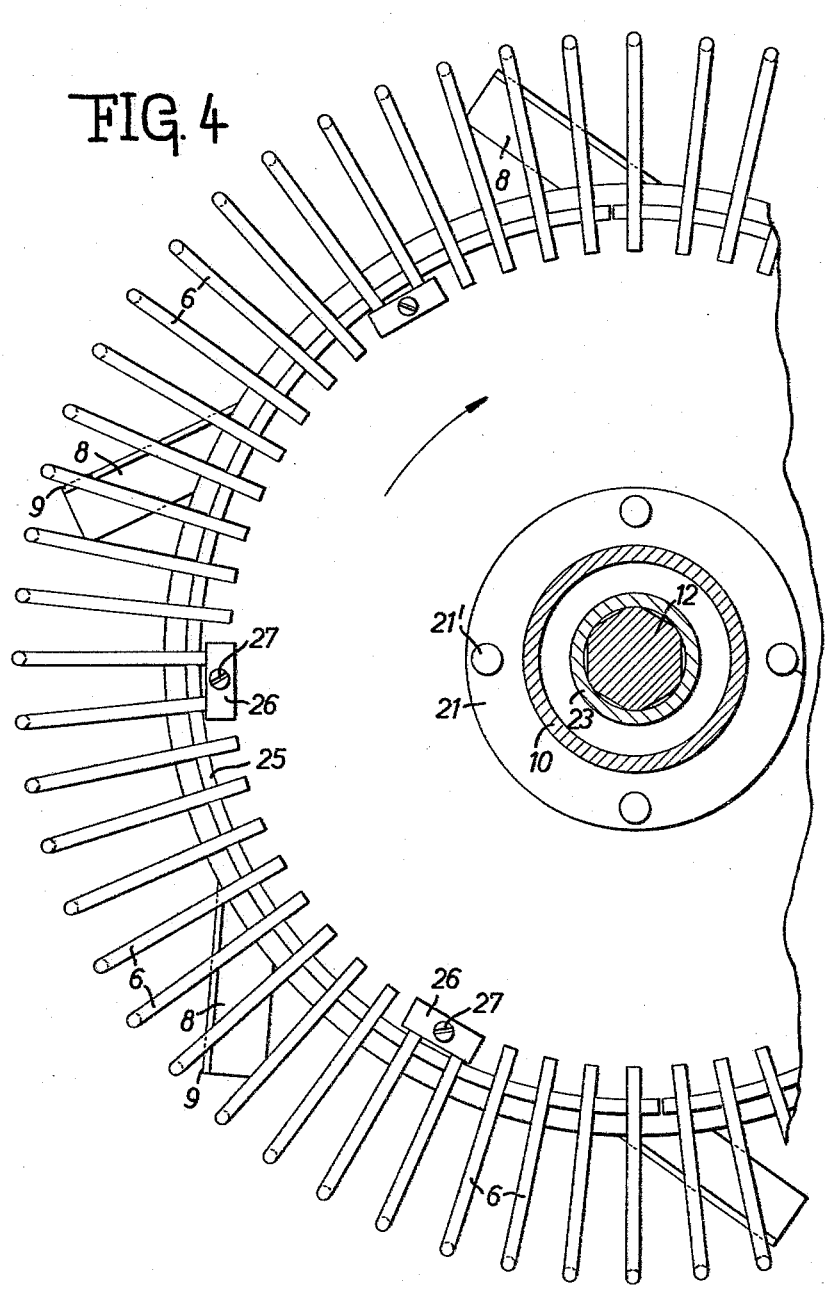

July 24, 1962 F. KIBINGER ETAL 3,045,679
HOP PICKER
Filed Aug. 17, 1959 7 Sheets-Sheet 4
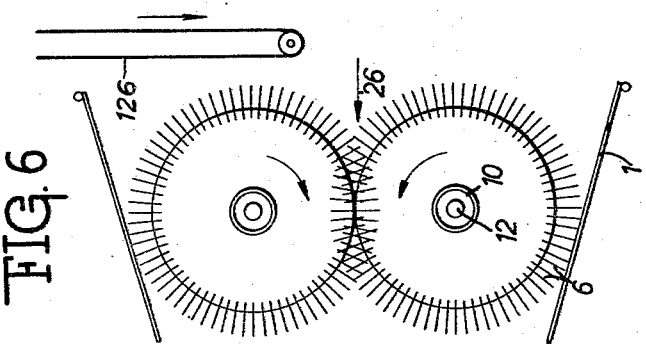
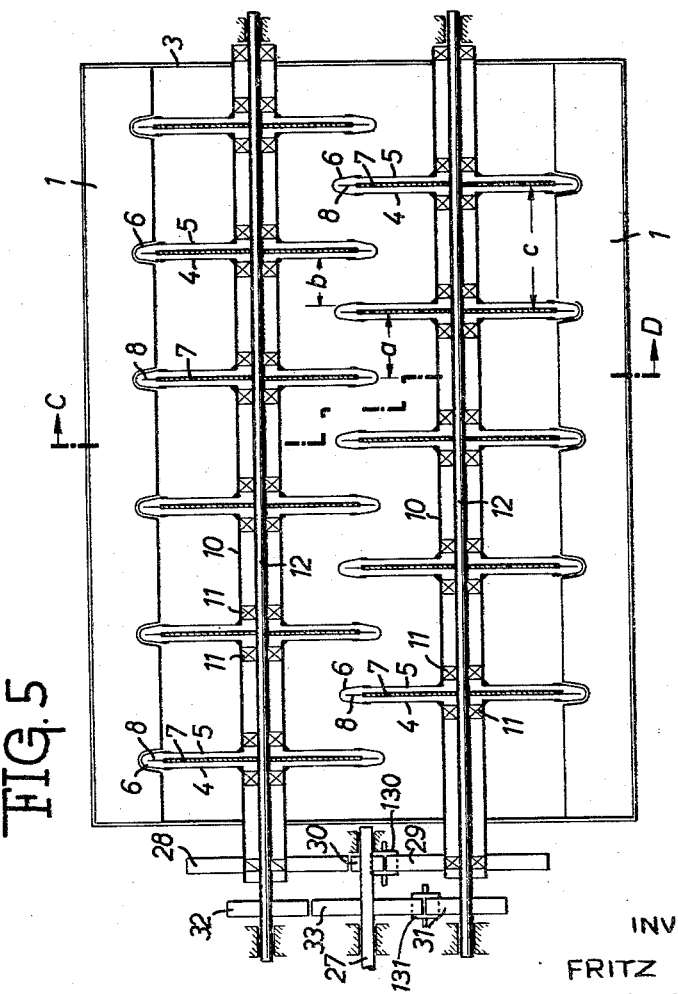
INVENTORS
FRITZ KIBINGER
HANS EDER
BY
Dicke and Craig
ATTORNEYS

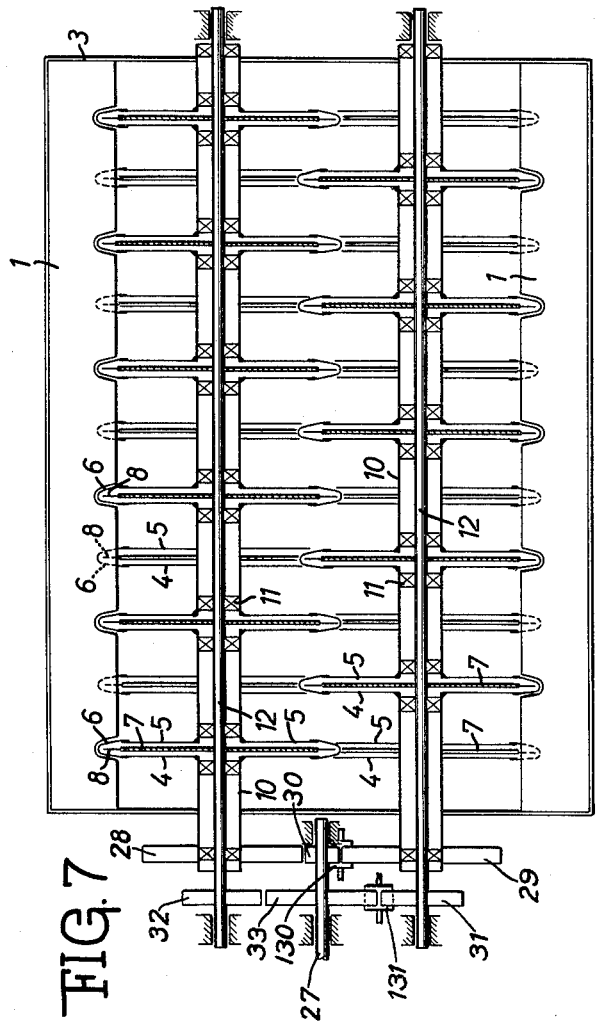

July 24, 1962     F. KIBINGER ETAL     3,045,679
HOP PICKER
Filed Aug. 17, 1959     7 Sheets-Sheet 6
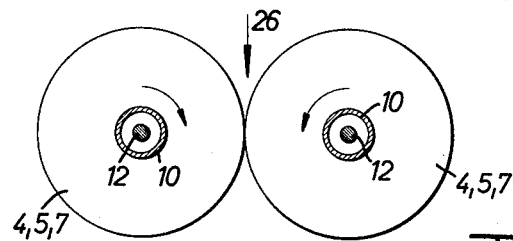
FIG. 8
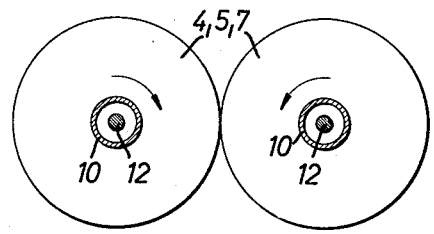
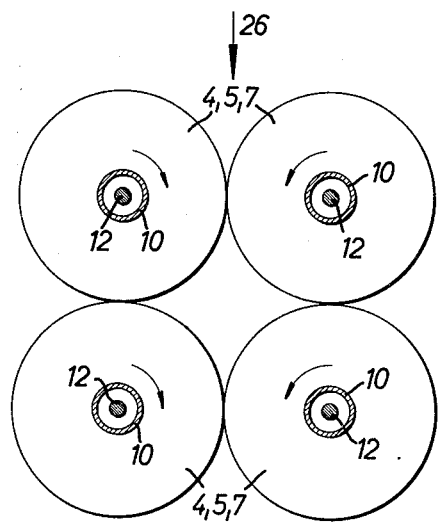
FIG. 9
INVENTORS
FRITZ KIBINGER
HANS EDER
BY
Dicke and Craig
ATTORNEYS INVENTORS
FRITZ KIBINGER
HANS EDER
BY
Dicke and Craig
ATTORNEYS United States Patent Office 3,045,679
Patented July 24, 1962

3,045,679
HOP PICKER
Fritz Kibinger, 4 Alemannenstrasse, Munich 9, Germany, and Hans Eder, 54 Bergmannstrasse, Munich 12, Germany; said Hans Eder assignor to Fritz Kibinger
Filed Aug. 17, 1959, Ser. No. 834,026
Claims priority, application Germany Aug. 21, 1958
21 Claims. (Cl. 130—30)

The present invention relates to a device for the harvesting of hops.

In order to sever the strobiles of hops from the branches carried by the bines, a picking device has been proposed, having driven shafts on the periphery of a rotary disc, perpendicular to the plane faces thereof, with revolving cutter tools, to which tools gratings were associated fixed to the said disc as supporting means for the material to be separated and as deflectors for the strobiles, the material to be separated being thrown into the space enclosed by the gratings.

Each of the gratings associated with such a rotating cutter tool consisted of two wires, bars or the like, partly curved in the shape of circular arcs, arranged one above the other, the lower being below the plane of the cutter tools. The radius of curvature of each wire, bar or the like in its arcuate range was smaller than the largest radius of the cutter tool, and both wires, bars or the like were connected to one another by deflector bars, preferably of V-shape, extending substantially radially to the axes of the cutter tools. The bends of the deflector bars had a distance from the axis of rotation of the associated cutter tool which exceeded the radius of the cutter tool. The spacing between the wires, bars or the like forming the grating, which are to be considered as fixed relative to the axes of rotation of the cutter tools, was so dimensioned that even the smallest strobile could not pass between these wires, bars or the like. A second disc was also associated with the rotary disc above which deflector means and severing means were arranged. Both of these discs were rigidly connected to one another by stays and were mounted on an axle. Between these two discs driving means were provided for the shafts of the cutter tools. Each rotating shaft was provided with several cutter tools arranged one above the others and having associated gratings, and provision was made for varying the spacing of the cutter tools arranged one above the others from one another. Additionally, bars taking part in the rotation may be arranged between any two adjacent cutter tools, which bars move the cut material outward.

The use of such a picking device is based on the assumption that the branches severed from the bines are cut into pieces so that the branches had to be cut into pieces either by hand or by a special cutting device before being inserted into the device. This picking device has proved successful as such, but has the disadvantage that the danger of jamming exists when too much of the material is thrown into the picking device.

The present invention has the main object of providing a device for the harvesting of hops which can be used not only for the dividing of branches into pieces, but also for the picking, depending on how its associated components are arranged relative to one another. It is also an object of the present invention to use in a pure severing device the same components as in a picking device. It is yet another object of the invention to effect an improved, and particularly a quicker supply of the material.

With these and other objects in view which will become apparent later from this specification and the accompanying drawings I provide a device for the harvesting of hops, comprising in combination: rotatable cutters and rotatable grating mounted co-axially to the said cutters and screening the same so as to deflect even the smallest strobiles of the hops from the said cutters.

The device according to the present invention may comprise at least one rotary unit having two co-axial shafts and discs spaced from one another mounted on said shafts, two of said discs being associated with the outer shaft and being connected to one another by V-shaped yokes, and enclosing between one another an intermediate disc associated with the inner shaft. The intermediate disc is provided, at its periphery, with cutters the outer edges of which lie on a circle which has a slightly smaller diameter than the space bounded by the yokes of the outer discs and the outer shaft is driven at a lower rotational speed than the inner shaft. Assuming a single rotary unit is to be used, the same is to be mounted between side walls sloping down inwardly. By arranging groups of discs, each consisting of two discs connected with one another by grating and of a disc having cutters on its periphery arranged intermediate the said two discs, in such a manner that between any two discs of adjacent groups carrying cutters there is a spacing of about 8", it is made possible to subdivide the branches into pieces which may then be thrown into a picking device as described hereinabove.

Although it is possible in principle to also carry out picking operations with groups of discs formed as described when arranging these groups of discs at a smaller spacing than stated above—in which case the spacing between two cutter discs of adjacent groups should amount to about 1⅜"—it is advisable to arrange two of the units on the same level and axially offset from one another in such a manner that the spacing of the axes of rotation of these units is smaller than the diameter of the circle passing through the outer points of the yokes of the group of discs of a group. It is convenient to make the spacing of the axes of rotation of the units equal to the diameter of a circle determined by the outer edges of the cutters of the groups of discs on their rotation. It is essential that the units be driven in opposite directions in such a manner that the material to be severed is moved inwardly from outside.

Although a device composed of two such units is preferably to be used for the picking of the strobiles, it can of course be so designed, that it serves merely for the severing of the branches. These two cases are distinguished from one another only by the spacing of the individual groups of discs from each other. When the device is exclusively to be used for the separating of pieces of branches, leaves, strobiles and stems, it is convenient to associate with the two units arranged on the same level two further units which are mounted below the two first mentioned units and offset from them in such a manner that the groups of discs of the lower units lie below the interstices between the groups of discs of the upper units, the spacing between cutter discs lying in parallel planes preferably amounting to 1⅜" when viewed in projection. Although the distance of the axes of rotation of the units arranged above one another may exceed the outer diameter of a group of discs, it is advisable to arrange the units mounted side by side and one above the others with a mutual offset in such a manner, that not only the spacing of the axes of rotation of the upper units from one another but also the spacing of the axes of rotation of the lower units from one another and from the axes of rotation of the upper units is equal to the diameter of a circle passing through the outer edges of the cutters of the groups of discs of a unit.

While according to the above statement the branches severed from the bines could be divided into pieces and/ or the strobiles picked from the branches, namely by introducing the material to be severed or to be picked from above, such devices are suitable also for the severing of the cut off bines or of the branches by moving the same in the horizontal direction, the material to be severed being then moved transversely of the axes of rotation of the rotary units, i.e. parallel to the planes of the discs. It should then be possible to move the bines with the branches or the branches only through the device at a speed which corresponds to the rotational speed of the gratings associated with the cutters, or which speed may be lower or higher.

This movement is attained according to a further feature of the invention in that at least one moving or movable belt for example an endless conveyer belt, tangent to the gratings, is associated with the rotary units. In the case of the provision of a single moving or movable belt the same is to be arranged below the rotary unit, i.e. substantially parallel to the plane or planes defined by the axes of rotation of the rotary units. It is convenient to cover the belt where it comes into contact with the revolving gratings by resilient materials, for example foam rubber, in such a manner that the gratings partly engage into the resilient material or materials. Thus it is for example made possible to set the gratings in motion by a driven belt so that only those shafts are to be driven which carry the cutters. Of course conversely the discs carrying the gratings may be driven, and the belt be moved or set in rotation thereby. The thickness of the resilient means should exceed the depth of penetration into the same, so that strobiles which have incidentally been pressed into the resilient material cannot be squashed.

When the severing and/or picking of the bines is to be effected by pulling the same through the rotary units at a speed which is independent of the rotational speed of the gratings, it is advisable to arrange after the rotary units a means serving for pulling the bines through the rotary units, e.g. a conveyer belt having dogs for carrying along the ends of the bines. To the same the ends of the bines may be attached and pulled by it through the rotary units at the speed actually required. In this case it is advisable to associate a further moved or movable belt with the rotary units, for example an endless conveyor belt. The axes of rotation of the rollers of the conveyor belt lie then likewise in a plane parallel to the axes of rotation of the rotary units.

Figure 11:
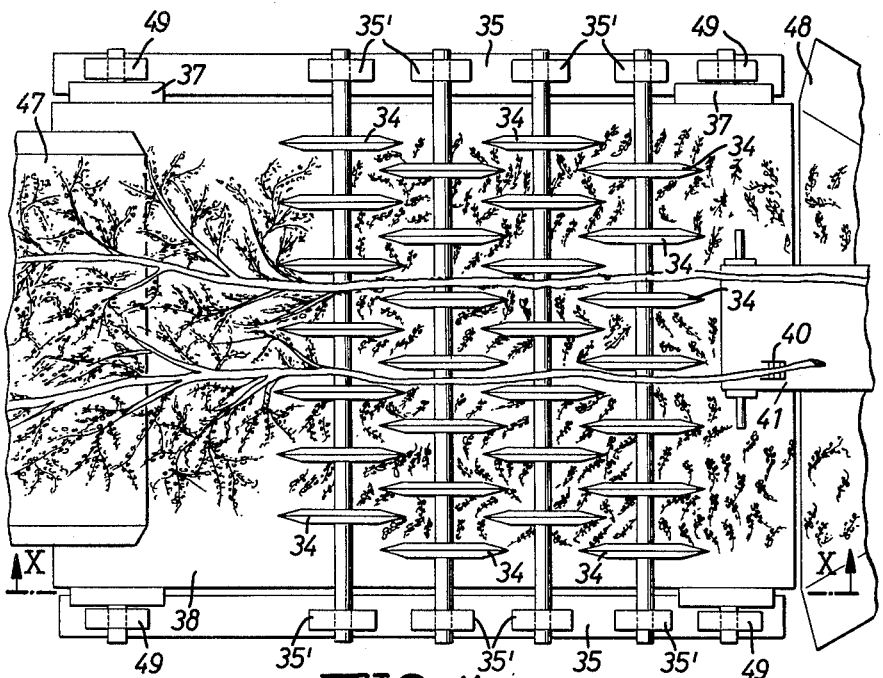

These and other features and objects of our said invention will be clearly understood from the following description of some embodiments thereof, given by way of example with reference to the accompanying diagrammatic drawings in which:

FIG. 1 is a plan view partly in section of a unit arranged in a container having sloping side walls, which serves preferably for the subdividing of hop branches into pieces, the drive for the two co-axial shafts of this unit being indicated, FIG. 2 is a section on the line A—B of FIG. 1, FIG. 3 is a section of a group of discs and of the co-axially arranged shafts thereof, on a larger scale, FIG. 4 is a side elevation partly in section of the group of discs according to FIG. 3, FIG. 5 is a plan view partly in section of another embodiment comprising a container having sloping walls and in which two groups of discs are arranged the drive of both these units being indicated, FIG. 6 is a part section on line C—D of FIG. 5 showing the feed conveyor, FIG. 7 is a plan view partly in section of a third embodiment comprising a container having sloping walls and in which four units are arranged, two of which are at the same level, and two others are arranged below the two first mentioned ones, FIG. 8 is a part-section to FIG. 7 the vertical distance between the units arranged above one another exceeding the horizontal distance between the units arranged side by side, FIG. 9 is a part section of a modification of FIG. 8 wherein the vertical distance between the units arranged above one another equals the horizontal distance between the units arranged side by side, FIG. 10 shows in side elevation a general arrangement of a hop picking device according to the invention having two endless conveyer belts associated with several rotary units, and a conveyer device arranged after the rotary units to which the ends of the bines to be severed or to be picked are to be fixed, in section on line X—X of FIG. 11, FIG. 11 is a plan view, the severing and picking device of this embodiment corresponding substantially to the embodiment according to FIG. 10 but having the upper conveyor omitted.

According to the embodiment of FIGS. 1 and 2, in a container 3 having sloping side walls 1, 2 a unit comprising several groups of discs is arranged. This unit consists of discs 4, 5 connected to one another, for example by welding, through yokes 6 forming a grating and serving as deflectors. Between any two discs 4, 5 a disc 7 is arranged which on its circumference carries several cutters 8, in the present embodiment six of them, which are so arranged that the circle described by the outer edges 9 of these cutters has a diameter which is slightly smaller than the diameter of the space bounded by the discs 4, 5 and the yokes 6. The spacing of the yokes 6 from one another is so dimensioned, that the strobiles of the hops cannot get into the space bounded by the discs 4, 5 and the yokes whereby a destruction of the hops strobiles by the revolving cutters 8 is obviated.

Although in the embodiment according to the FIGS. 1 and 2 the individual groups of discs, consisting of the discs 4, 5 connected by the yokes 6 and of the disc 7 carrying cutters 8, engage into recesses of the side walls 1, 2, it is advisable to dimension the distance of the side walls so that the yokes can revolve with comparatively little clearance between the side walls, and to arrange deflector bars 101 in each group of discs where the same may touch the side walls, which bars deflect the branches, introduced into the container from above in the direction of the arrow 26', towards the groups of discs so that in the range of the side walls no jamming of any kind may occur when comparatively many branches are thrown in at the same time.

The discs 4, 5 are in force-closed connection with one another through hollow shaft sections 10, in which a shaft 12 is journaled by means of bearings 11, on which shaft 12 the discs 7 are fixedly mounted. How the discs 7 can best be located fixedly on the shaft 12 will be explained later with reference to the FIGS. 3 and 4. In the embodiment illustrated in FIG. 1 a sprocket wheel or a belt pulley 13 is associated with the hollow shaft 10 while on the shaft 12 a sprocket wheel or belt pulley 14 is keyed. The two shafts are driven by chains or endless belts 15, 16 from a shaft 17 on which two sprocket wheels or belt pulleys 18, 19 are keyed. The diameters of the sprocket wheels or belt pulleys 13, 14, 18, 19 or the number of teeth of the sprocket wheels are so chosen, that the shaft 12 is set in rotation at a substantially higher number of revolutions than the hollow shaft 10. One may accordingly provide, instead of a chain drive, a belt drive in which case a spring loaded jockey roller should be associated with each of the two endless belts. Owing to the fact that the two discs 4, 5 mutually connected and provided with deflector yokes 6 rotate comparatively slowly, for example at 30 r.p.m. branches thrown into the container from above in the direction of the arrow 26' which have not yet been subdivided at once into pieces by the cutters of the discs revolving at a substantially higher speed, for example 600 r.p.m. are carried along in the direction of the arrow 20, which indicates the direction of rotation, and if they have not been subdivided on their way to the opposite side wall, they are subdivided when they are moved in the vicinity of the side wall in the direction towards the groups of discs by the said side wall or by the deflectors 101 provided thereon.

A group of deflector yokes forming a grating is shown on a larger scale in FIGS. 3 and 4 in section and in side elevation, respectively. It will be seen that the discs 4, 5 are fixedly located on the hollow shaft sections 10 by means of rings 21, in that these rings 21 are welded to the hollow shaft sections, and the discs 4, 5 are fixedly attached to the rings 21 by rivets 21'. The two bearings 11 associated with a hollow shaft section 10 are located by circular clips or the like 22, and serve for journaling the shaft 12, which in this embodiment (see FIG. 4) is designed as a hexagon profile having rounded edges. Each disc 7 carrying knives 8 has accordingly an aperture corresponding to the profile of the shaft 12. Any shifting in the axial direction is prevented by tubular sections 23 pushed over the hexagon shaft. The cutters 8 arranged on the discs 7 for example in an oblique position are fixed to the discs 7 by rivets 24. It is advisable not to fix the deflector yokes 6 directly to the discs 4, 5 but to fix each of them with the interposition of a wire ring 25 the wire rings 25 being conveniently welded to the yokes 6 while these rings are yet open at a point, and this structure then being fitted over the discs 4, 5 and fixed thereon, for example by means of lugs 26 and screws 27, after the discs 4, 5, 7 have been attached to the shafts 10, 12.

If not only a subdivision of the branches into pieces but also a severing of the branches into branch sections, leaves, strobiles and stem is to be effected, the distance between the groups of discs has to be reduced correspondingly, or two units, each composed of several groups of discs and shafts are to be arranged side by side, and/or on top of one another such as shown for example in the embodiment according to the FIGS. 5 and 6. The spacing between the axes of rotation of the shaft 10, 12 of the two units of the embodiment according to the FIGS. 5 and 6 is chosen so that those discs which carry cutters or yokes axially offset from one another are tangential to one another (FIG. 6) as viewed in side elevation, although the spacing of the axes of rotation of the units arranged side by side may be even slightly larger.

While in the embodiment according to FIG. 1 it is inherently irrelevant in which direction the groups of discs rotate, it is essential in the case of the embodiment according to FIGS. 5 and 6 that the groups of discs of adjacent units rotate in opposite directions, namely so that the branches thrown in from above are conveyed to the middle where they are in any case severed into pieces, even if they have not been cut to pieces before. It is particularly convenient to let a conveyer belt 126 which supplies the branches, end above the container in such a manner that the branches conveyed thereby impinge on the groups of discs in the direction of the arrows 26. In this case it is advisable to dimension the spacing $a$ between adjacent discs 7 carrying knives about 1⅜″ so that the distance $b$ between two adjacent discs 4, 5 amounts to about 1″, and that the hops strobiles can pass out downward through this interstice without being damaged, since the spacing of the deflector yokes 6 from one another prevents the drawing in of hops strobiles into the spaced bounded by discs 4, 5 and the yokes 6. In this case the spacing $c$ between the center planes of two adjacent discs 7 of a unit amounts to about 2¾″.

Here, too, care is taken for driving the shafts 10, 12 of both units as in the embodiment according to FIG. 1, for example by toothed gearing from a common shaft 27. The shafts 10 each carry a spur gear 28, 29, respectively, in mesh with a spur gear 30 keyed to the shaft 27, while the shafts 12 each carry a spur gear 31, 32 in mesh with a spur gear 33 fixedly mounted on the shaft 27. Idler gears 130, 131 are interposed between the gears of the shafts 10 and 12 of one unit and the driving shaft 27 so as to reverse their sense of rotation with respect to the shafts 10, 12 of the other unit.

In this case it is not necessary to let the groups of discs engage into recesses of the side walls of the container. The side walls 1 may for example be substantially tangent to the groups of discs, since owing to the two units turning inwardly from outside even material lying in the range of the side walls is moved inward, if it has not been subdivided already before.

In order to prevent branches supplied, which do not drop on to the groups of discs in the direction of the arrow 26, from being subdivided or cut to pieces insufficiently, it is advisable to arrange below the units illustrated in FIGS. 5 and 6 two further units, as illustrated diagrammatically in FIGS. 7 to 9. Accordingly below two units arranged in one horizontal plane two further units are arranged offset half a pitch longitudinally, so that in any case it is made sure that the branches supplied are faultlessly cut to pieces. The drive of the units arranged side by side and above one another may be effected in a manner corresponding to that described with reference to FIG. 5, namely even when the lower units have a larger spacing from the upper ones than each unit has from the other journaled at the same level. Merely care has to be taken, that both groups of units run in opposite directions of rotation and that they move any material inserted towards the center, as indicated in FIGS. 6, 8 and 9 by the arrows. Otherwise the assembly of the units corresponds to that of the embodiments according to the FIGS. 1 to 4, so that no further explanation of the embodiments according to FIGS. 7 to 9 is required.

It is advisable to make the containers mobile, particularly capable of being driven, in order to transport the same quickly from one site to another, and particularly so as to be able of driving them over hops plantations. In this case means for supplying the branches severed from the bines to the severing and picking device may be dispensed with, although it is advantageous to equip even the mobile containers with a conveyor means, particularly a conveyor belt, in order to make sure that the branches are always supplied at the same point of the containers.

The main shaft driving the shafts of the units should be provided not only with a belt pulley 117 but also with a coupling component 118 by means of which it can be coupled with the power take off 119 of a tractor, so that the driving means available in agriculture can be exploited.

Several rotary units 34 are journaled in bearings 35' mounted on a conveniently mobile chassis 35 in a horizontal plane in such a manner that the spacing of their axes of rotation is smaller than would correspond to the outer diameters of the rotary units. Adajacent rotary units interengage accordingly with one another (FIG. 11). Below the rotary units an endless conveyer belt 36 running around drums 37 is arranged, which has a lining of resilient material, for example foam rubber, moss rubber or the like. When only the discs carrying cutters associated with the individual rotary units are driven, then it is necessary to drive at least one of the drums 37 namely in the direction in which the material to be severed or to be picked is passed through the rotary units.

In the embodiment illustrated in FIG. 10 this direction of movement of the conveyer belt is indicated by the arrow 39. Accordingly the gratings of the rotary units set in rotation by the conveyer belt turn in the same direction. Although the direction of rotation of the cutters arranged between the individual gratings may alternatively by opposite to the direction of rotation of the gratings it is advisable to let also the cutters rotate anti-clockwise but as mentioned already hereinabove at a higher rotational speed than the gratings. When the cutters and gratings are driven by the shafts on which they are mounted, then the conveyer belt provided with a resilient lining 38 need not be driven since it is set in rotation by the gratings.

The thickness of the resilient lining 38 exceeds the depth of penetration of the said gratings into it.

When the severing and picking device consists only of rotary units and of a belt, particularly conveyer belt, then it suffices to supply the bines with the branches or the branches only to the rotary units and to the conveyer belt respectively. Particularly when bines with branches are to be supplied to such a device it is advisable to arrange after the rotary units 34 a device for pulling the bines, which in the embodiment according to FIG. 10, consists of a conveyer belt 41 carrying dogs 40 which is driven in the clockwise sense of FIG. 10 (arrow 43). Each bine carrying branches and strobiles is firstly pushed through the rotary units until its leading end has left the rotary units, and is then attached to one of the dogs 40. While one or more bines are being pulled through, the operator attending the severing- and picking-device can put new bines in readiness. In this case, when the bines are moved through the rotary units by a pulling device, it is convenient to arrange the rotary units at least partly between two moving belts as shown in the embodiment according to FIG. 10. Since the axes of rotation of the rotary units lie in a horizontal plane, a second conveyer belt 44 running around drums 45 is arranged above the first three rotary units 34. This conveyer belt is likewise provided with a resilient layer 46, for example of foam rubber, likewise of a thickness exceeding the depth of penetration of the gratings into it. It takes care that all branches of the bines carrying strobiles are passed through the space defined by the rotary units. The supply of the bines and/or branches may be effected by a guide chute 47, the discharge of the severed and picked parts is preferably effected by a guide chute 48.

Although not shown in the embodiments, walls, which have been omitted from the drawings for the sake of clarity, may be arranged between the bearings 35' and the bearings 49 of the drums 37 on the one hand, and the discs facing the same on the other hand, in order particularly to prevent parts severed off from dropping out on the sides.

How many rotating gratings or cutters discs are to be included in each individual rotary unit, depends on the actual requirements. The width of the device may be smaller or larger than in the embodiment according to FIG. 11. Obviously several rotary units may be arranged not only one after the other but also on top of one another, if this is considered convenient for one reason or another. Accordingly rotary units may be arranged as in FIGS. 8 or 9, when two walls only are used instead of four. Obviously even these two walls may be dispensed with.

While we have described herein and illustrated in the accompanying drawings what may be considered typical and particularly useful embodiments of our said invention we wish it to be understood that we do not limit ourselves to the particular details and dimensions described and illustrated; for obvious modifications will occur to a person skilled in the art.

What we claim as our invention and desire to secure by Letters Patent, is:

1. A device for the harvesting of hops, comprising in combination: rotatable cutting means and rotatable grating means mounted co-axially to the said cutting means and screening the same so as to deflect even the smallest strobiles of the hops from said cutting means, said rotatable grating means including two discs so constructed and arranged as to be rotatable together and yokes attached to each of said discs and connecting the same, said yokes forming a grating surrounding said cutting means so as to deflect said hops therefrom, said cutting means comprising a third disc intermediate said two discs having cutters attached to the periphery thereof.

2. A device for the harvesting of hops, comprising in combination: at least one rotary unit having tubular outer shaft sections, an inner shaft arranged co-axially with the said outer shaft sections and at least one group of discs, two of the said discs facing one another being fixedly mounted on adjacent tubular shaft sections and a third disc being fixedly mounted on the said inner shaft intermediate the said two discs, cutters attached to the periphery of the said intermediate disc, yokes attached to the said two discs and connecting the same with one another, the said yokes forming a grating closely surrounding the said cutters and deflecting even the smallest strobiles of the hops from the said cutters and driving means operatively connected to both the said outer shaft sections and to the said inner shaft, in operation driving the latter at a higher rotational speed than the said outer shaft sections.

3. A device as claimed in claim 2, comprising side walls sloping down inwardly and closely flanking the said group of discs.

4. A device as claimed in claim 2, comprising two hoop rings fixedly connected to the said yokes forming the said grating with them, the said hoop rings being detachably connected to the said two discs mounted on adjacent outer tubular shaft sections.

5. A device as claimed in claim 2, wherein the said inner shaft is of a non-circular profile, the said intermediate discs being filed on the said inner shaft with correspondingly profiled holes, and comprising in addition distance tubes co-axial with the said inner shaft and spacing the said inner discs from one another, and bearings journalling said outer tubular shaft sections on the said distance tubes.

6. A device as claimed in claim 2, comprising at least two rotary units side by side mounted at a distance of their axes from one another smaller than the outer diameters of their gratings and with their groups of discs axially offset from one another, the said two rotary units being driven in operation in opposite directions of rotation in such a manner that the hops material fed to them is moved inwardly by them.

7. A device as claimed in claim 6, wherein the distance of the axes of the said two units from one another is equal to the diameter of the circles described by the outer edges of the said cutters.

8. A device as claimed in claim 6, comprising in addition two further rotary units arranged side by side below the said two rotary units, the groups of discs of the said two further rotary units being arranged below the interstices between adjacent groups of discs of the said two rotary units above them.

9. A device as claimed in claim 6, comprising in addition two further rotary units arranged side by side below the said two rotary units, the spacing of the axes of the said two further rotary units from those of the said two rotary units above them being equal to the spacing between the axes of the rotary units arranged side by side.

10. A device as claimed in claim 6, comprising side walls sloping down inwardly substantially tangent to the outer circumferences of the gratings of the said two rotary units.

11. A device as claimed in claim 6, comprising a movable chassis mounting the said rotary units.

12. A device as claimed in claim 11 comprising a conveyor means arranged after the said rotary units and having dogs engaging the bines of the hops and pulling the same through the said rotary units.

13. A device as claimed in claim 11, comprising a main shaft in driving connection with the inner and outer shafts of the said rotary units, and coupling means mounted on the said main shaft in operation coupled to the power take off of an agricultural tractor.

14. A device as claimed in claim 13 comprising at least one conveyer means contacting the gratings of at least one of the said rotary units.

15. A device as claimed in claim 14, comprising inlet guide means supplying the bines and branches of the hops to the said rotary units, and outlet guide means discharging the severed and picked material from the said rotary units.

16. A device as claimed in claim 15, comprising a resilient lining covering the surface of the said conveyer means contacting the said gratings, the latter engaging partly into the said resilient lining.

17. A device as claimed in claim 16, wherein the thickness of the said resilient lining exceeds the depth of penetration of the said gratings into it.

18. A device for harvesting hops, comprising in combination: rotatable cutting means and a rotatable grating means mounted coaxially to said cutters and screening the same, said rotatable grating means including two discs so constructed and arranged as to be rotatable together and yokes attached to each of said discs and connecting the same, said yokes forming a grating surrounding said cutting means so as to deflect even the smallest strobiles of the hops from said cutting means, said cutting means being arranged intermediate said two discs and being so constructed and arranged as to be rotatable independently of said two discs.

19. A device for harvesting hops, comprising in combination; rotatable cutting means and a rotatable grating means mounted coaxially to said cutters and screening the same, said rotatable grating means including two discs so constructed and arranged as to be rotatable together and yokes attached to each of said discs and connecting the same, said yokes forming a grating surrounding said cutting means so as to deflect even the smallest strobiles of the hops from said cutting means, said cutting means comprising a third disc intermediate said two discs having cutters attached to the periphery thereof, said intermediate disc being so constructed and arranged as to be rotatable independently of said two discs.

20. A device for harvesting hops, comprising in combination; rotatable cutting means, a rotatable grating means mounted coaxially to said cutting means and screening the same, said rotatable grating means including two discs so constructed and arranged as to be rotatable together and yokes attached to said discs and connecting the same, said yokes forming a grating surrounding said cutting means so as to deflect even the smallest strobiles of the hops from said cutting means, said cutting means comprising a third disc intermediate said two discs having cutters attached to the periphery thereof, said intermediate disc being so constructed and arranged as to be rotatable independently of said two discs, and driving means for separately rotating said two discs and said intermediate disc, said intermediate disc being driven at a higher rotational speed than said two discs.

21. A device for harvesting hops as defined in claim 19, further including side walls sloping down inwardly and closely flanking said cutting means and said grating means.

References Cited in the file of this patent

UNITED STATES PATENTS

| | | |
|---|---|---|
| 2,370,331 | Susunaga | Feb. 27, 1945 |
| 2,856,977 | Hughes | Oct. 21, 1958 |

FOREIGN PATENTS

| | | |
|---|---|---|
| 162,495 | Austria | Mar. 10, 1949 |